US007111852B2

(12) United States Patent
Woods et al.

(10) Patent No.: US 7,111,852 B2
(45) Date of Patent: Sep. 26, 2006

(54) UTILITY CART

(75) Inventors: Donald Woods, Celestine, IN (US); Ruben Flores, Redondo Beach, CA (US)

(73) Assignee: Kimball International, Inc., Jasper, IN (US)

( * ) Notice: Subject to any disclaimer, the term of this patent is extended or adjusted under 35 U.S.C. 154(b) by 219 days.

(21) Appl. No.: 10/835,560

(22) Filed: Apr. 29, 2004

(65) Prior Publication Data

US 2005/0242534 A1 Nov. 3, 2005

(51) Int. Cl.
*B62B 3/10* (2006.01)
(52) U.S. Cl. .................. 280/47.34; 312/249.8
(58) Field of Classification Search ............... None
See application file for complete search history.

(56) References Cited

U.S. PATENT DOCUMENTS

| D139,534 | S | * | 11/1944 | Adams ................. D34/19 |
| D178,739 | S | | 9/1956 | Slavsky et al. ........... D33/19 |
| 4,720,048 | A | * | 1/1988 | Maroney et al. ......... 280/47.34 |
| 4,875,696 | A | * | 10/1989 | Welch et al. ............ 280/47.34 |
| 4,976,450 | A | * | 12/1990 | Ellefson ................ 280/79.11 |
| 5,016,948 | A | * | 5/1991 | Welch et al. .......... 312/249.12 |
| 5,056,331 | A | * | 10/1991 | Lotz ..................... 62/237 |
| 5,269,545 | A | * | 12/1993 | Huebschen et al. ....... 280/47.35 |
| 5,290,058 | A | * | 3/1994 | Adams et al. ........... 280/651 |
| 5,489,106 | A | * | 2/1996 | Engelking et al. ....... 280/47.35 |
| 5,515,125 | A | | 5/1996 | Gerver .................. 353/122 |
| D378,454 | S | | 3/1997 | Miller et al. ............ D34/21 |
| 5,634,649 | A | * | 6/1997 | Breining et al. ......... 280/47.35 |
| 5,765,842 | A | * | 6/1998 | Phaneuf et al. ......... 280/47.35 |
| 6,008,621 | A | * | 12/1999 | Madison et al. ......... 320/107 |
| 6,024,427 | A | | 2/2000 | Underwood et al. ... 312/249.12 |
| 6,669,214 | B1 | * | 12/2003 | Domis ................... 280/47.35 |

OTHER PUBLICATIONS

"Overhead and LCD Carts", Bretford, 1 page, http://bretford.com/products.
"Werndl Communicatorby Vecta", Steelcase, 1 page, http://steelcase.com/servlet.
"Machine Stand, LCD Projectors", Item No. 215, Vertiflex, 1 page, http://vertiflex.com.
"Presentation Stand", Mayline Group, 1 page, http://mayline.com/showcase.
"Bebop Cart", Knoll, 1 page, http://knoll.com/products.
Kimball International, Inc., 1 page, http://kimballoffice.com/products/tables.

(Continued)

*Primary Examiner*—Christopher P. Ellis
*Assistant Examiner*—Christopher Bottorff
(74) *Attorney, Agent, or Firm*—Baker & Daniels

(57) ABSTRACT

A utility cart including a housing portion having a cabinet and a storage compartment disposed above the cabinet. A cover member is slidably mounted to the housing for movement between a first or closed position, in which the cover member is disposed above the storage compartment and substantially encloses the storage compartment, and a second or open position, in which the cover member is disposed in a cantilevered orientation with respect to the housing, such that the storage compartment is substantially exposed. A peripheral device, such as a projector, for example, may be stored within the storage compartment, such that the peripheral device is enclosed within the cart when the cover member is in its first position and is accessible when the cover member is in its second position. Additionally, the housing of the cart may include an electrical terminal incorporated therein for providing electrical power to the peripheral device.

13 Claims, 5 Drawing Sheets

OTHER PUBLICATIONS

"Portfolio Teamwork W3", Metro, a Steelcase Company, 1 page, htpp://metrofurniture.com/portfolio.

"The Complete Meeting Room" (Mobile Unit), Nevers Industries, 2 pages, http://nevers.com.

"The Complete Meeting Room" (Storage Cart/Storage Unit), Nevers Industries, 1 page, http://nevers.com.

"Conferencing Program", Paoli Furniture, 4 pages, http://tellusfurn.com/catalog.

"Allsteel Marbles Mobile Office Furniture", Allsteel Office, 1 page, http://allsteeloffice.com/marbles.

Photo of a storage cart, Bretford, 1 page, http://bretford.com.

"Get in touch with Mayline Group. Furniture for processing, storage and retrieval", Mayline Group, 1 page, hhtp://mayline.com.showcase.

"Hospitality Cart", Bretford, 1 page, http://bretford.com/products.

Photo of Storage Cart, Kimball International, Inc., 1 page, http://kimballoffice.com/products/tables.

"Teamwork: File Cart", Metro, a Steelcase Company, 1 page, http://metrofurniture.com/portfolio.

* cited by examiner

FIG_1

UTILITY CART

BACKGROUND OF THE INVENTION

1. Field of the Invention

The present invention relates to utility carts of the type commonly used in office or other workspace environments, such as mobile utility carts for storing and transporting various items, or for supporting electronic peripheral units such as television sets, projectors, computers, printers, and the like.

2. Description of the Related Art

One known utility cart includes a metal frame having a plurality of open shelves, and includes casters mounted to the lower portion of the frame to facilitate rolling movement of the cart along a floor surface. The shelves may be used to support electronic peripheral devices such as television sets, projectors, and computers, for example, as well as to store and transport other related items.

Although such carts are simple in design and are inexpensive, there are a number of disadvantages associated with such carts. First, the open shelf design of the carts allows access to any peripheral devices which are supported by the carts, potentially allowing unauthorized removal of the devices from the carts. Additionally, hold-down devices, such as straps or other connectors, are typically required to hold a peripheral device such as a television set or a projector to the cart and to prevent the device from falling off of the cart, such as during movement of the cart from one location to another. Further, such carts typically do not include electrical terminals and electrical outlets for easy electrical connection of electronic peripheral devices to a power source, and also do not include suitable electrical extension cord management features. Rather, such carts typically only provide brackets or other structure upon which an electrical extension cord may be wound.

What is needed is a utility cart which is an improvement over the foregoing.

SUMMARY OF THE INVENTION

The present invention provides a utility cart including a housing portion having a cabinet and a storage compartment disposed above the cabinet. A plurality of casters, mounted to a lower portion of the housing, support the cart for rolling movement along a floor surface. A cover member is slidably mounted to the housing for movement between a first or closed position, in which the cover member is disposed above the storage compartment and substantially encloses the storage compartment, and a second or open position, in which the cover member is disposed laterally outwardly of the storage compartment in a cantilevered orientation with respect to the housing, such that the storage compartment is substantially exposed. A peripheral device, such as a projector, for example, may be stored within the storage compartment, such that the peripheral device is enclosed within the cart when the cover member is in its first position and is accessible when the cover member is in its second position. Additionally, the housing of the cart may include an electrical terminal incorporated therein, the terminal including at least one outlet for providing electrical power to the peripheral device.

In one embodiment, the storage compartment of the cart is relatively wide and deep, and occupies a substantial volume of the upper portion of the housing of the cart. The relatively large storage compartment allows a projector or other relatively large peripheral device to be stored therein, such that when the cover member is in its first or closed position, the projector is completely enclosed within the storage compartment. The projector may include a projector arm movable between a retracted or storage position in which the projector arm is disposed within the storage compartment, and an extended or use position in which the projector arm extends upwardly from the projector and externally of the storage compartment when the cover member is in its second or open position.

The cover member is slidably mounted to the housing, such as with a pair of standard drawer slide assemblies. The cover member is shaped similar to a drawer, and includes a top tray, a pair of side walls, and a drawer front including a drawer pull. The top tray of the cover member provides a work surface in both the first and second positions of the cover member, and is recessed to prevent items such as papers, transparencies, pens, pencils, etc., from falling off of the top tray. Additionally, the cabinet of the cart includes a pair of doors and a plurality of shelves therein, allowing for easy storage of items used with the projector or other peripheral device. An upper end of the cart additionally includes a handle which may be grasped by a user to facilitate easy rolling movement of the cart from one location to another.

In one form thereof, the present invention provides a cart, including a housing including a cabinet and a storage compartment disposed above the cabinet; and a cover member movably mounted to the housing, the cover member movable between a first position in which the cover member substantially encloses the storage compartment and a second position wherein the storage compartment is substantially exposed.

In another form thereof, the present invention provides a cart, including a housing having a storage compartment disposed in an upper portion of the housing, the housing further including an electrical terminal having at least one electrical outlet; and a cover member movably mounted to the housing between a first position in which the cover member substantially encloses the storage compartment and a second position in which the storage compartment is substantially exposed.

In another form thereof, the present invention provides a cart, including a housing including an upper portion having a storage compartment, and a lower portion including a plurality of casters; and a cover member slidably mounted to the housing and having horizontal dimensions substantially equal to corresponding horizontal dimensions of the storage compartment, the cover member slidable between a first position in which the cover member substantially encloses the storage compartment and a second position in which the cover member is disposed laterally outwardly of the storage compartment wherein the storage compartment is substantially exposed.

In still another form thereof, the present invention provides, in combination, a cart including an upper portion having a storage compartment therein, the cart further including a cover member movably mounted to the upper portion and movable between a first position in which the cover member substantially encloses the storage compartment and a second position in which the storage compartment is substantially exposed; and a peripheral unit disposed within the storage compartment.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 1:
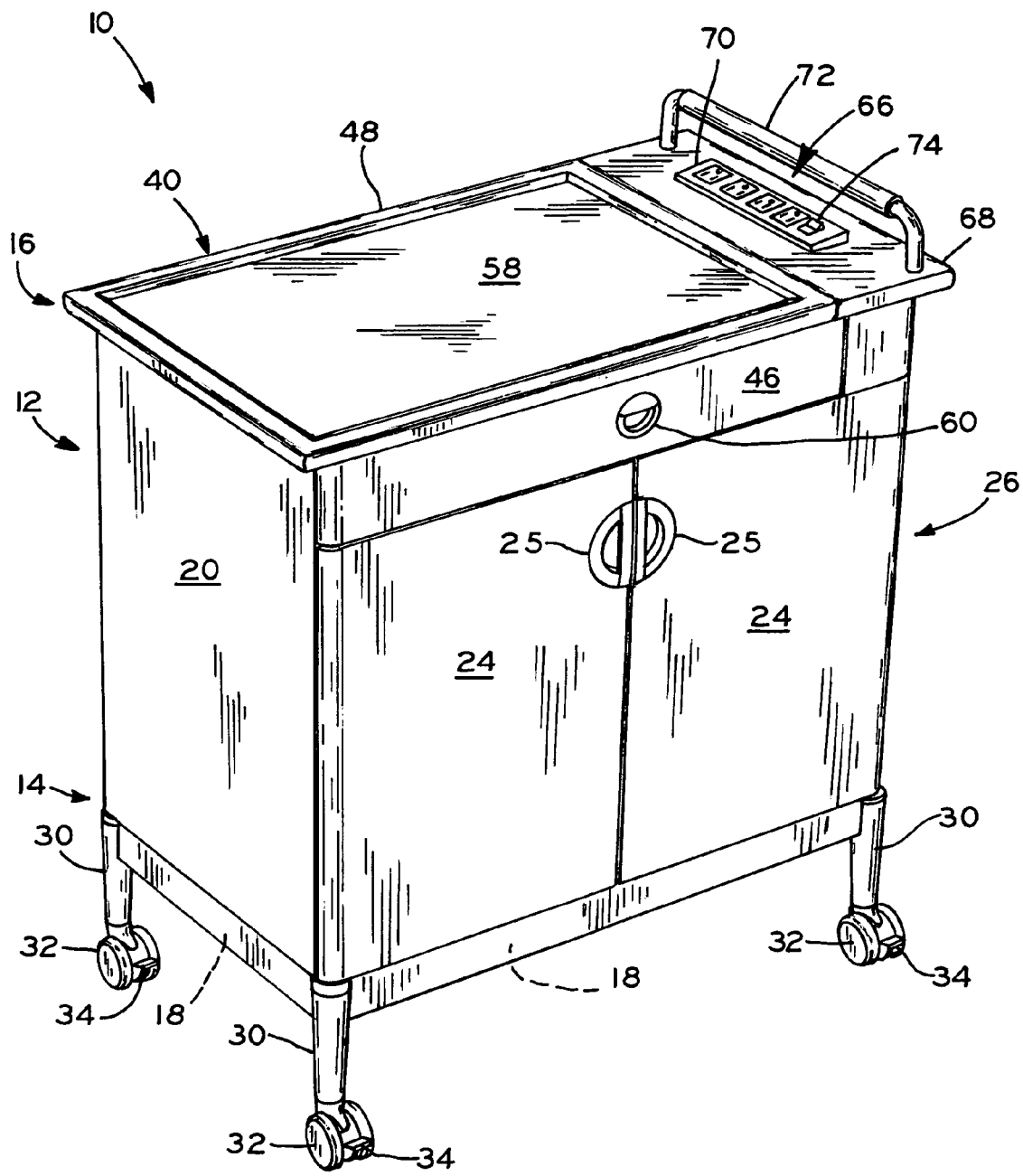
FIG. 1 is perspective view of a utility cart according to the present invention, shown with the cover member disposed in a first position in which a storage compartment of the cart is closed.

Referring to FIGS. 1–6, a utility cart 10 according to the present invention is shown, which generally includes housing 12 having lower portion 14 and upper portion 16. Housing 12 generally includes bottom wall 18, a pair of side walls 20, rear wall 22, and a pair of doors 24 hingedly attached to side walls 20. Doors 24 include door pulls 25 for grasping by a user to open doors 24, and doors 24 may further optionally include locks for locking doors 24 in a closed position. Side walls 20, rear wall 22, and doors 24 generally define a cabinet 26 which may include one or more horizontal shelves 28 (FIG. 5) therein. A plurality of legs 30 are attached to bottom wall 18, and each terminate in caster wheels 32 for allowing rolling movement of cart 10 from one location to another along a floor surface. Optionally, casters 32 may include foot-actuated brake assemblies 34 which may be engaged to prevent movement of casters 32 and thereby fix the position of cart 10.

Figure 3:
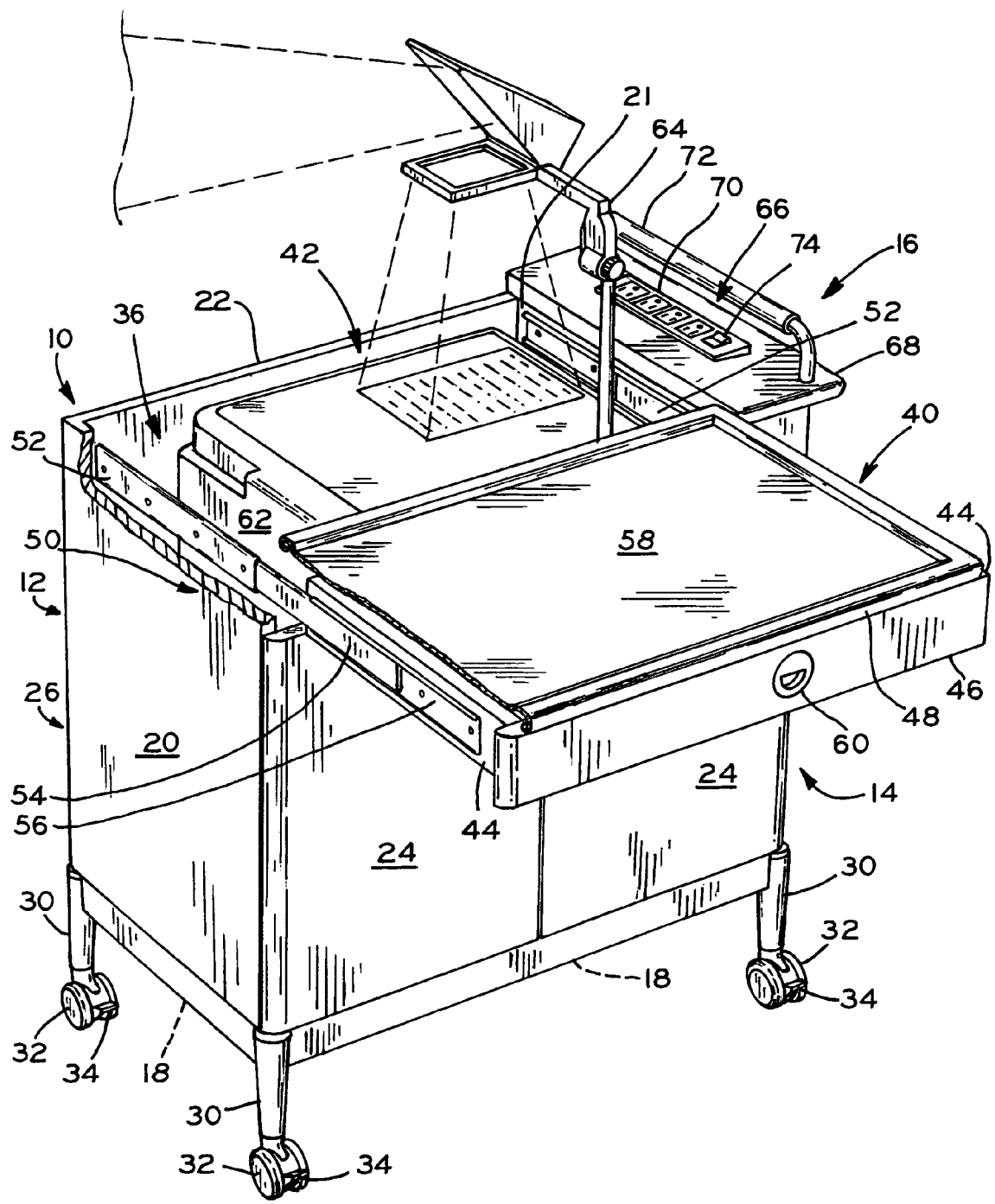
FIG. 3 is a another perspective view of the cart of FIG. 1, shown with the cover member disposed in a second position in which the storage compartment of the cart is exposed for use, and further showing a projector disposed within the storage compartment.
Figure 5:
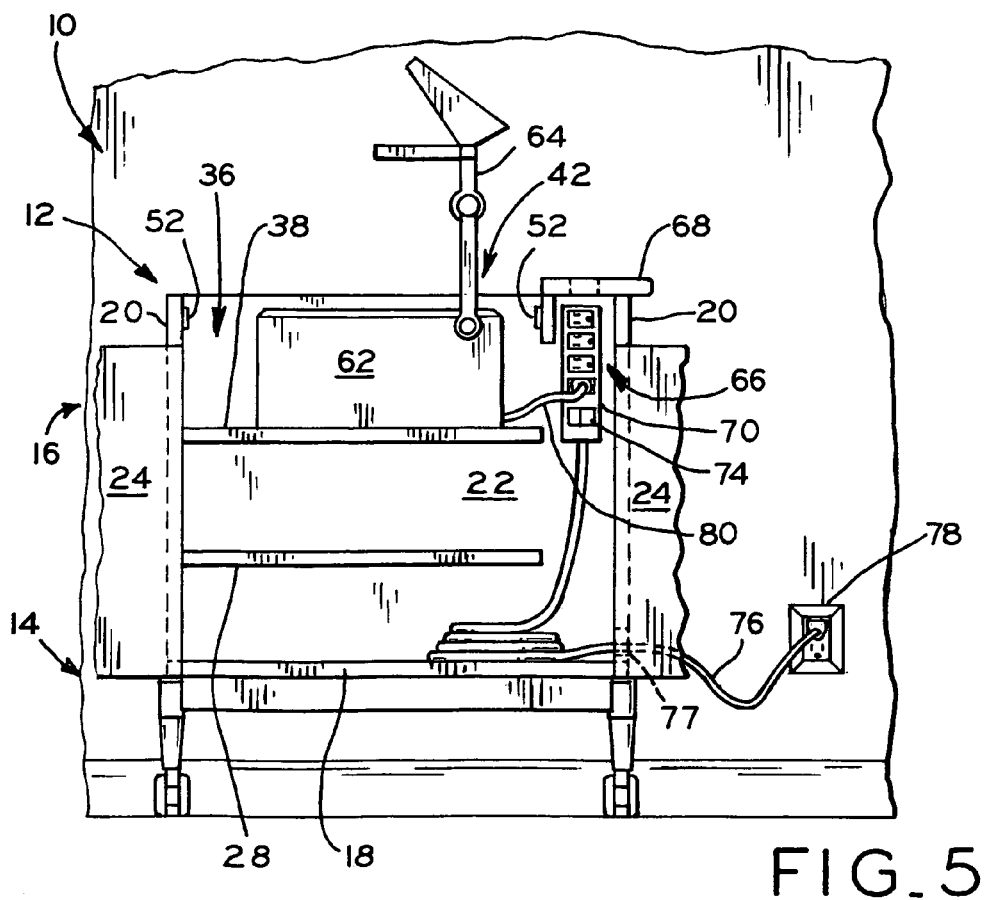
FIG. 5 is a cross-sectional view of the cart of FIG. 1, shown with the cover member disposed in a second position in which the storage compartment of the cart is exposed for use, and further showing a projector disposed within the storage compartment.

Referring to FIGS. 3 and 5, upper portion 16 of cart 10 includes a storage compartment 36 which is enclosed by the upper portions of side walls 20 and rear wall 22, as well as storage compartment shelf 38 and cover member 40. It may be seen that storage compartment 36 is relatively wide and deep, and occupies a substantial portion of the volume of the upper portion 16 of housing 12 of cart 10. In this manner, a relatively large peripheral device, such as projector 42, for example, may be stored within storage compartment 36 of cart 10. Although cart 10 is shown and described herein with reference to a particular peripheral device disposed within storage compartment 36, namely projector 42, many other peripheral devices, such as computers, printers, etc., may also be stored or housed within storage compartment 36 for use with cart 10.

Cover member 40 is slidably mounted to upper portion 16 of housing 12, and generally includes a pair of side walls 44, front wall 46, and top tray 48 connected to one another. A pair of standard drawer slide assemblies 50, such as ball bearing-type drawer slide assemblies which are readily available from a number of commercial sources, may be used to slidably mount cover member 40 to upper portion 16 of housing 12 of cart 10. Specifically, each drawer slide assembly 50 may include a first slide member 52 mounted to the interior of one of side walls 20 or interior wall 21 of cart 10, and a second slide member 54 telescopingly disposed within the first slide member 52 and third slide member 56 which is mounted to the exterior of one of side walls 44 of cover member 40.

Top tray 48 of cover member 40 defines a work surface 58 on which office items such as papers, transparencies, pens, pencils, etc. may be placed. As shown herein, top tray 48 is also recessed to prevent items such as pens and pencils from rolling off of top tray 48. Front wall 46 of cover member 40 includes a pull 60 which may be grasped by a user to move cover member 40 between its first and second positions, as discussed below.

Figure 2:
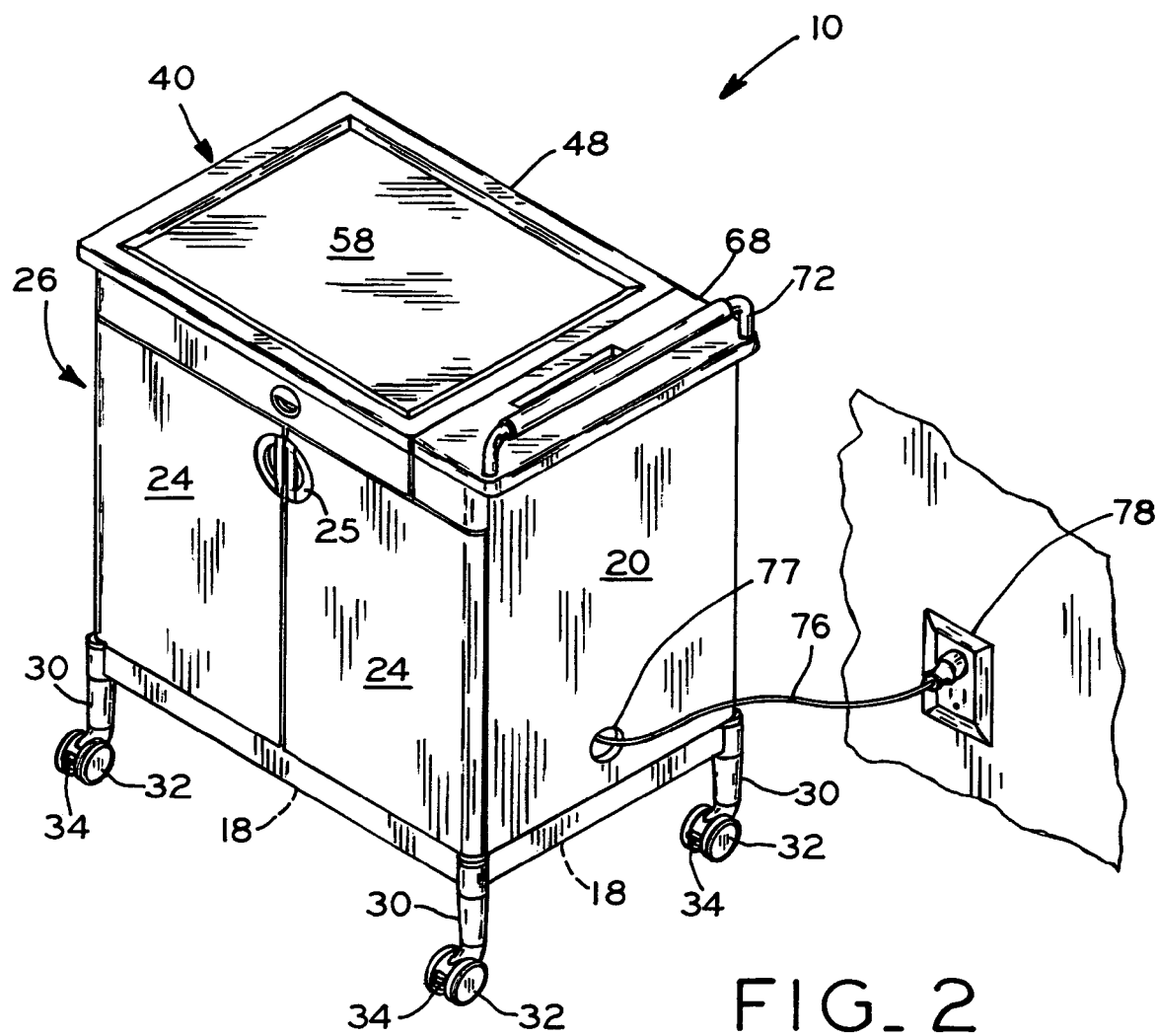
FIG. 2 is a another perspective view of the cart of FIG. 1, shown with a cord electrically connecting an electrical terminal of the cart with an electrical wall outlet.

Referring to FIGS. 1–3, cover member 40 is mounted to cart 10 for substantially horizontal sliding movement between a first or closed position, shown in FIGS. 1 and 2, and a second or open position, shown in FIG. 3. In the first or closed position, cover member 40 is disposed substantially above storage compartment 36 and substantially encloses storage compartment 36. As may be seen from FIGS. 2–4, the horizontal dimensions of storage compartment 36 and cover member 40 are substantially similar, such that cover member 40 completely covers storage compartment 36 in the first or closed position of cover member 40. In the second or open position of cover member, shown in FIG. 3 cover member 40 is disposed laterally outwardly of storage compartment 36 in a cantilevered orientation with respect to housing 12. In this position, storage compartment 36 is upwardly-opening and substantially exposed for access.

Figure 4:
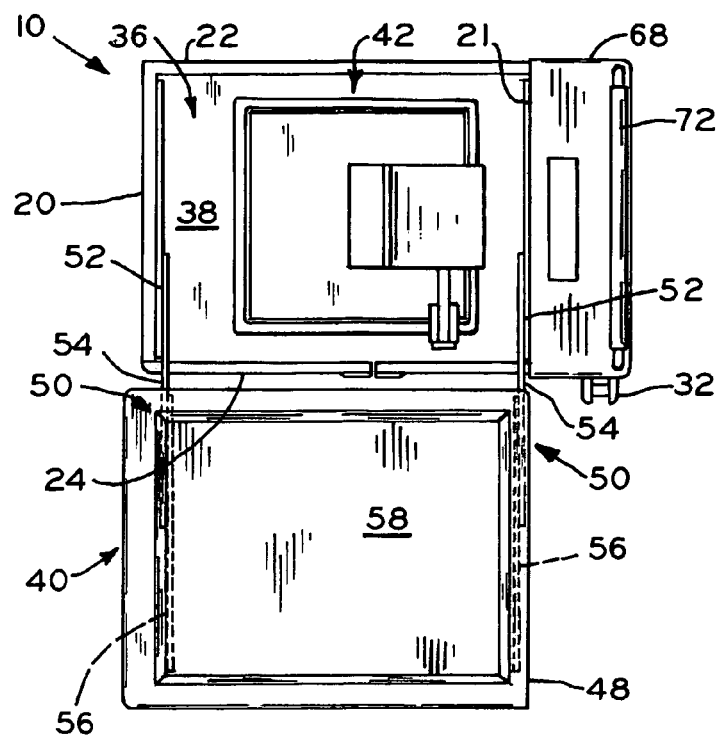
FIG. 4 is a plan view of the cart of FIG. 1, shown with the cover member disposed in a second position in which the storage compartment of the cart is exposed for use, and further showing a projector disposed within the storage compartment.

Referring to FIGS. 3–5, a projector 42 is shown disposed within storage compartment 36. Projector 42 may be any known type of projector, such as those which are configured to project transparencies or opaque papers, or those which are configured to project a computer display or other electronic image. Projector 42 generally includes a body 62 containing a light source therein, and a projector arm 64 pivotally attached to body 62. Typically, projector arm 64 includes a reflector mirror or lens assembly to reflect and/or focus a projected image from body 62 to a vertical screen or wall (not shown). When cover member 40 of cart 10 is in its first position or closed, projector arm 64 is pivoted downwardly to a retracted or storage position in which projector arm is contained within storage compartment 36. However, when cover member 40 is disposed in its second or open position, projector arm 64 may be pivoted upwardly from body 62 of projector 42 to an extended or use position in which projector arm 64 extends upwardly and outwardly of storage compartment 36.

Figure 6:
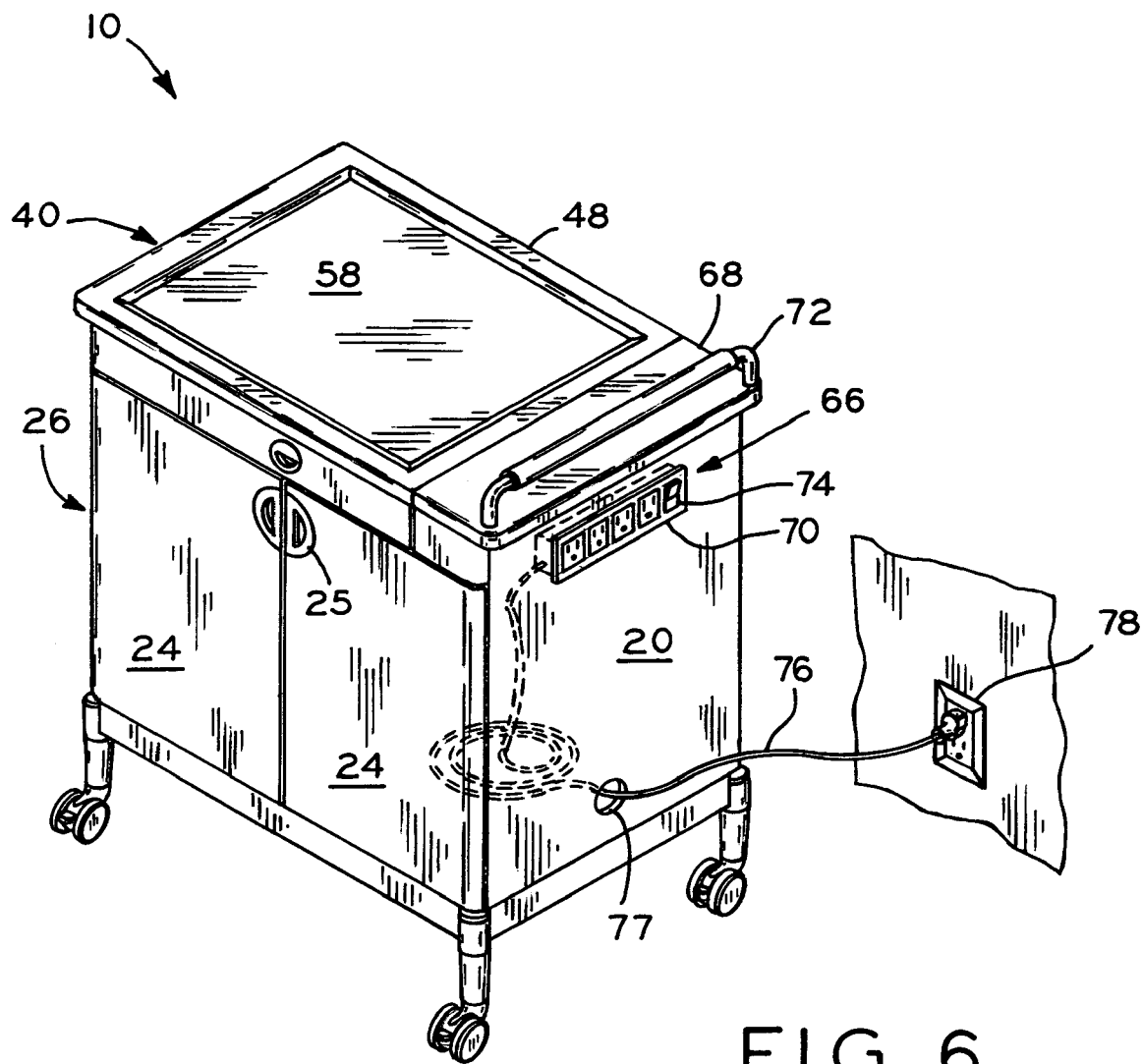
FIG. 6 is a perspective view of the cart of FIG. 1, shown with an alternative placement of the electrical terminal.

Referring to FIGS. 1–6, upper portion 16 of housing 12 additionally includes a control portion 66 disposed adjacent storage compartment 36 and cover member 40, including top wall 68 mounted to housing 12. Mounted within top wall 68 is electrical terminal 70 including switch 74 which distributes power to electrical terminal 70 and can be operated to interrupt or conduct electrical power from cord 76. Cord 76 can conduct power from any electrical source including electrical wall outlet 78, and is housed within the interior of cabinet 26 of cart 10 and extendable through access opening 77 in side wall 20 of cart 10. Electrical terminal 70 includes a plurality of electrical outlets to which electrical devices can be connected, including projector 42. As illustrated in FIG. 5, projector 42 is electrically connected to electrical terminal 70 through cord 80. Electrical terminal 70 can be oriented in any position that is convenient for the use of projector cart 10. Alternative positions of electrical terminal 70 are illustrated in FIGS. 5 and 6 in which electrical terminal 70 is disposed within side wall 20 or within cabinet 26 of cart 10. Additionally, curved tubular-shaped handle 72 includes end portions mounted to top wall 68 of control portion 66, and may be grasped by a user for moving cart 10 along a floor surface from one location to another.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cart, comprising:
   a housing including a cabinet and a storage compartment disposed above said cabinet;
   a cover member movably mounted to said housing, said cover member movable between a first position in which said cover member is disposed above said storage compartment and substantially encloses said storage compartment and a second position in which said cover member is disposed laterally outwardly of said storage compartment in a cantilevered orientation with respect to said housing wherein said storage compartment is substantially exposed; and
   a peripheral unit disposed within said storage compartment, wherein said peripheral unit is a projector, said projector including an arm movable between a first arm position in which said arm is disposed within said storage compartment, and a second arm position, corresponding to said cover member second position, in which said arm extends outwardly of said storage compartment.

2. The cart of claim 1, wherein said cover member is slidably mounted to said housing for substantially horizontal movement between said first and said second positions.

3. The cart of claim 1, wherein said housing further includes an electrical terminal, said electrical terminal including at least one electrical outlet.

4. The cart of claim 1, further comprising a plurality of casters mounted to a lower portion of said housing, whereby said cart may be moved across a floor surface.

5. A cart, comprising:
   a housing having a storage compartment disposed in an upper portion of said housing, said housing further including an electrical terminal having at least one electrical outlet, said electrical terminal exposed outwardly of said housing;
   a cover member movably mounted to said housing via a pair of opposing slide members for horizontal sliding movement between a first position in which said cover member substantially encloses said storage compartment and a second position in which said storage compartment is substantially exposed; and
   a peripheral unit disposed within said storage compartment, wherein said peripheral unit is a projector, said projector including an arm movable between a first arm position in which said arm is disposed within said storage compartment, and a second arm position, corresponding to said cover member second position, in which said arm extends outwardly of said storage compartment.

6. The cart of claim 5, wherein in said first position said cover member is disposed above said storage compartment, and in said second position said cover member is disposed laterally outwardly of said storage compartment in a cantilevered orientation with respect to said housing.

7. The cart of claim 5, further comprising a plurality of casters mounted to a lower portion of said housing, whereby said cart may be moved across a floor surface.

8. A cart, comprising:
   a housing including an upper portion having a storage compartment, and a lower portion including a cabinet and a plurality of casters;
   a cover member slidably mounted to said housing and having horizontal dimensions substantially equal to corresponding horizontal dimensions of said storage compartment, said cover member slidable between a first position in which said cover member substantially encloses said storage compartment and a second position in which said cover member is disposed laterally outwardly of said storage compartment wherein said storage compartment is substantially exposed, said cover member including a wall depending vertically therefrom which at least in part defines a front wall of said housing when said cover member is in said first position; and
   a peripheral unit disposed within said storage compartment, wherein said peripheral unit is a projector, said projector including an arm movable between a first arm position in which said arm is disposed within said storage compartment, and a second position, corresponding to said cover member second position, in which said arm extends outwardly of said storage compartment.

9. The cart of claim 8, wherein in said first position said cover member is disposed above said storage compartment, and in said second position said cover member is disposed in a cantilevered orientation with respect to said housing.

10. The cart of claim 8, wherein said housing further includes an electrical temminal, said electrical terminal including at least one electrical outlet.

11. In combination:
    a cart including an upper portion having a storage compartment therein, said cart further including a cover member movably mounted via a plurality of slide members to said upper portion and movable horizontally between a first position in which said cover member substantially encloses said storage compartment and a second position in which said storage compartment is substantially exposed;
    an electrical terminal including at least one electrical outlet, said electrical terminal mounted within said upper portion of said cart with said at least one electrical outlet exposed to an exterior of said cart; and
    a peripheral unit disposed within said storage compartment and electrically connected to said electrical outlet, wherein said peripheral unit is a projector, said projector including an arm movable between a first arm position in which said arm is disposed within said storage compartment, and a second position, corresponding to said cover member second position, in which said arm extends outwardly of said storage compartment.

12. The cart of claim 11, wherein in said first position said cover member is disposed above said storage compartment, and in said second position said cover member is disposed laterally outwardly of said storage compartment in a cantilevered orientation with respect to said housing.

13. The cart of claim 11, further comprising a plurality of casters mounted to a lower portion of said housing, whereby said cart may be moved across a floor surface.

* * * * *

UNITED STATES PATENT AND TRADEMARK OFFICE
CERTIFICATE OF CORRECTION

PATENT NO.       : 7,111,852 B2                                              Page 1 of 1
APPLICATION NO.  : 10/835560
DATED            : September 26, 2006
INVENTOR(S)      : Donald Woods et al.

It is certified that error appears in the above-identified patent and that said Letters Patent is hereby corrected as shown below:

Claim 10, Column 6, Line 50, delete "temminal" and insert --terminal--

Signed and Sealed this

Twelfth Day of December, 2006

JON W. DUDAS
*Director of the United States Patent and Trademark Office*